March 12, 1968     P. M. HOTCHKIN     3,372,708
AUTOMATIC CAM OPERATED PLURAL VALVE CONTROL SYSTEM
Filed April 25, 1966     2 Sheets-Sheet 1
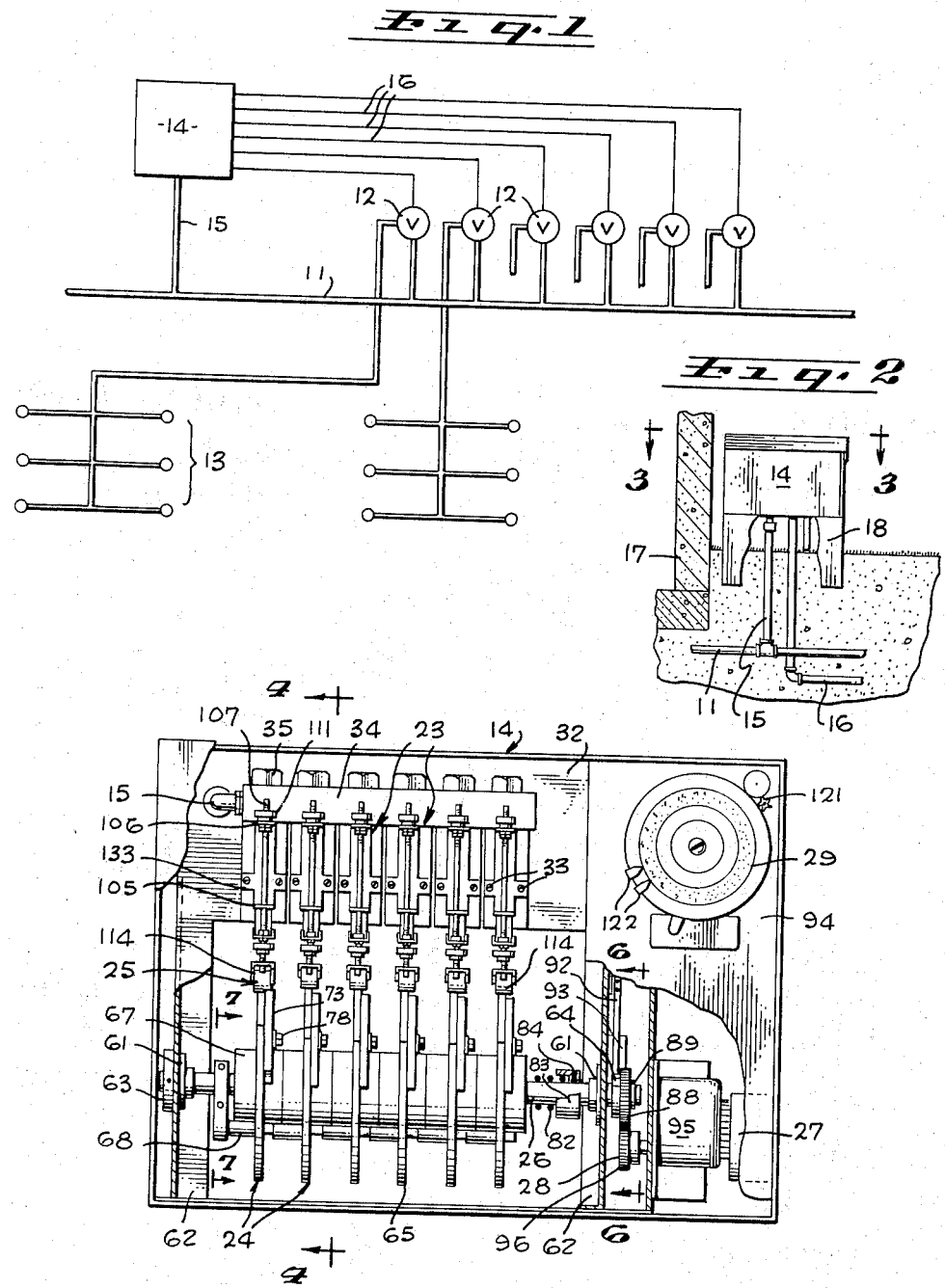
INVENTOR.
PAUL M. HOTCHKIN
BY
ATTORNEY March 12, 1968
P. M. HOTCHKIN
3,372,708
AUTOMATIC CAM OPERATED PLURAL VALVE CONTROL SYSTEM
Filed April 25, 1966
2 Sheets-Sheet 1
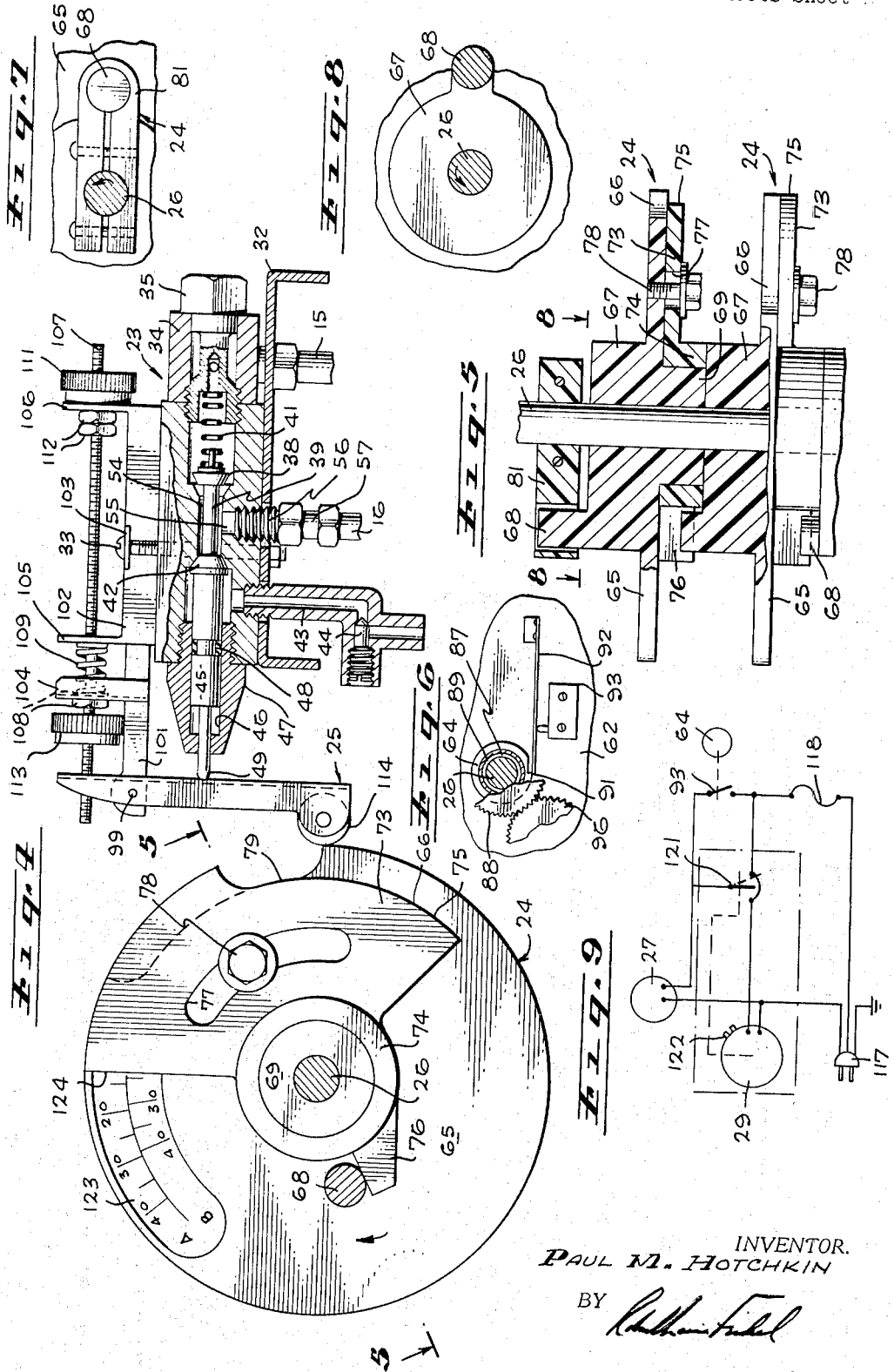
INVENTOR.
PAUL M. HOTCHKIN
BY
ATTORNEY

United States Patent Office 3,372,708
Patented Mar. 12, 1968

3,372,708
AUTOMATIC CAM OPERATED PLURAL VALVE
CONTROL SYSTEM
Paul M. Hotchkin, 20448 Quedo Drive,
Woodland Hills, Calif. 91364
Filed Apr. 25, 1966, Ser. No. 544,981
10 Claims. (Cl. 137—624.2)

This invention relates to automatic control systems, and more particularly to self-actuating systems for sequentially controlling the operation of a plurality of switches or valves, such as hydraulic valves, for timed periods. Although the subject invention has a variety of uses in industry and commerce, for descriptive purposes it will be illustrated as it might be employed with lawn sprinkler or crop irrigation installations.

Home lawns, parks, golf courses and cultivated crops need regular and controlled irrigation. The advantages in providing reliable means for automatically performing this task are many and obvious; and a great number of devices for carrying out this function are currently available. Unfortunately, however, most of these are costly to construct, and therefore high-priced, difficult to install, and expensive to maintain and operate. One object of the subject invention is to provide a device which, while satisfying this need can be manufactured simply and inexpensively and requires a minimum of maintenance and repair.

Another object of the invention is to provide a self-actuating device for controlling the operation of a plurality of remote hydraulic valves in a prearranged sequence for timed periods.

Another object is to provide a self-actuated control system, employing a plurality of cams, for controlling the operation of switches, valves or the like.

Still another object is the provision of such a system in which the cams are independently adjustable to vary the duration of operation of the switches or valves.

Yet another object is the provision of such a system in which each succeeding cam is driven directly by a preceding cam, thereby eliminating the need for a complex driving mechanism.

Still another object is the provision of an adjustable cam arrangement for use in such a system whereby the operating cycle of each succeeding cam is automatically advanced or retarded to compensate for the adjustments of all preceding cams.

Another object is the provision of a control system of the type described which can be made in compact and readily transportable form.

Many other and further objects will become apparent to the reader upon examination of the specification and claims which follow, as they are illustrated in the accompanying drawings, in which:

FIGURE 1 is a schematic view showing the subject invention as it might be incorporated in a typical lawn sprinkler installation;

FIGURE 2 is a partial side elevational, partial cross-sectional view showing the subject invention as it might be installed adjacent a building;

FIGURE 3 is an enlarged top plan view of the subject invention as shown in FIGURE 2 taken in the direction 3—3 with portions of the cover and internal mounting panels cut away to disclose important features of its construction;

FIGURE 4 is a further enlarged side elevational view of a typical cam and valve-actuating mechanism of the invention as illustrated in FIGURE 3 taken in the direction 4—4, with portions of the mechanism cut away to show its internal structure;

FIGURE 5 is a fragmentary top plan view of the end of the cam shaft of the subject invention as illustrated in FIGURES 3 and 4 taken in the direction 5—5 of FIGURE 4 with portions of two of the adjustable cams cut away to show their construction;

FIGURE 6 is a side elevational view of the cam shaft driving mechanism and microswitch arrangement illustrated in FIGURE 3 taken in the direction 6—6 with portions of one of the driving gears cut away to show its construction;

FIGURE 7 is a side elevational view of one end of the cam shaft shown in FIGURE 3 taken in the direction 7—7;

FIGURE 8 is a side elevational view of the same end of the cam shaft taken along the irregular line 8—8; and FIGURE 9 is a schematic diagram illustrating a preferred electrical circuit arrangement for use in the invention as described in the preceding figures.

To avoid undue and distracting repetition in the drawings, wherever practicable to do so without denigrating the clarity and accuracy of the specification, functionally or structurally identical elements will be identified only once, by a single numeral in each figure.

In FIGURE 1 water main 11 is shown connected through high pressure valves 12 to a plurality of remotely spaced sprinkler arrays, such as those indicated by the numeral 13. As will be seen, the subject invention may readily be adapted for use with high pressure valves 12 which are hydraulically, pneumatically, electrically or mechanically operated; however, for the purposes of this description valves 12 will be conventional hydraulically operated valves. The timing and active control mechanism of the subject invention is contained in a control box 14, which may be located at a considerable distance from hydraulic valves 12.

A supply line 15 carries high pressure water from main 11 to the mechanism in control box 14; and control lines 16 carry the hydraulic impulses which operate hydraulic valves 12 from control box 14. Control lines 16 are preferably flexible plastic hoses, but may be of any convenient construction and material.

Although as indicated earlier the subject invention may be made in portable form, where desired it may be built into a permanent installation, such as that illustrated by FIGURE 2. Here control box 14 is shown positioned adjacent the wall of a building 17 with its permanent connections to supply line 15 and control lines 16 concealed by a light foundation 18. If desired, control box 14 may be installed entirely below-ground for total concealment. The hinged cover of box 14 may be adapted for use in any of these applications.

Referring to FIGURES 3 through 9, the control mechanism itself comprises a plurality of substantially identical three-way bleeder valves 23, corresponding with hydraulic valves 12; a plurality of adjustable cams 24 and cam followers 25, cam driving means, including cam shaft 26, motor 27 and transmission train 28; an electrical timer 29; and electrical circuitry, shown in detail in FIGURE 9, for operating motor 27.

Bleeder valves 23 are mounted side-by-side in line on mounting bar 32 and fastened in place thereon by means of bolts 33. Mounting bar 32, in turn, may be attached to the inner walls of control box 14, or to an independent framework of convenient construction, portions of which are indicated by numeral 62.

A water header 34 is positioned across the intake ends of bleeder valves 23 and is connected with each valve through a hollow bolt 35, which is threaded through the header into the valve. The open end of header 34 is connected to supply line 15.

Taking any one of the valves 23 as typical for the purpose of description, an inlet valve 38 is mounted on a small stem 39 and is backed up by a light spring 41, extending from within the hollow bolt 35. The combined forces exerted by spring 41 and water pressure in header 34 urge the inlet valve 38 toward its closed position. The relief valve 42 is mounted at the opposite end of stem 39 from inlet valve 38. By adjusting the length of stem 39 or the relative positions of the inlet valve and relief valve seats, these two valves are made to cooperate so that when one is in its open position the other is in its closed position. When open, relief valve 42 discharges into drain 43, which may be provided with a water conserving valve 44. A pusher pin 45 is formed on the rear side of relief valve 42 and is adapted to slide freely in the bore 46 of a body extension 47, which is threadably inserted into the end of bleeder valve 23, and at the same time to support stem 39, inlet valve 38 and relief valve 42. An O-ring 48 prevents the leakage of fluid discharge by relief valve 42. An extension 49 on the end of pusher pin 45 extends outwardly through the end of body extension 47.

Stem 39 is somewhat smaller in diameter than the chamber 54 through which it passes, and an unobstructed port 55 in the floor of chamber 54 is connected by means of nipple 56 and coupling 57 to the control line 16 leading to the particular hydraulic valve 12 associated with the three-way bleeder valve 23. Thus, when sufficient pressure is exerted against the end of extension 49 to overcome the force exerted by spring 41 and water pressure in header 34, inlet valve 38 is opened and water at main line pressure will flow from header 34 into control line 16, and thence to hydraulic valve 12.

Hydraulic valves 12 are constructed to be maintained in their closed position by main line pressure in control lines 16.

Cam shaft 26 is journalled at its ends through bearings 61, mounted on framework 62 which, in turn, may be attached to the inner walls of control box 14 or mounted on independent supporting means. Lateral movement of cam shaft 26 is prevented by collar 63 and stop cam 64 which are secured to cam shaft 26.

As most clearly seen in the top view of FIGURE 3, each of the adjustable cams 24 is formed in two parts. The first is a flat, circular disk 65. A portion of the circumference of disk 65 is milled away to form an indented arcuate cam lobe 66. The outer face of disk 65 has a central hub 67, which serves both as a means for mounting disk 65 on cam shaft 26 and a spacer to aid in aligning the adjustable cams 24 with their respective cam followers 25 and bleeder valves 23. Disk 65 is provided with a lug 68, formed on the outer face of the disk and extending axially therefrom beyond the outer face of hub 67. The inner face of disk 65 is smooth and flat and is provided with a centrally located hub 69, of slightly smaller diameter than hub 67. Hubs 67 and 69 are bored to receive cam shaft 26 and permit the adjustable cams 24 to rotate freely about cam shaft 26.

The second component of adjustable cam 24 is an adjustable sector 73. A typical sector 73 is best seen in the side elevational view of FIGURE 4. Sector 73 has a centrally located hub 74, which is bored to receive and rotate freely about hub 69 of disk 65. The radius of sector 73 is the same as that of disk 65, and a portion of the periphery of sector 73 is milled away to provide an arcuate cam lobe 75 of the same depth as lobe 66 of disk 65. A dog 76 is formed on hub 74 to engage the lug 68 of the adjacent cam 24. An arcuate slot formed at 77 in sector 73 permits lock screw 78 to be inserted into a tapped hole in disk 65 and tightened, thereby clamping sector 73 and disk 65 together securely. By loosening lock screw 78, sector 73 may readily be rotated to adjust the length of the cleft 79 formed by the lobes of disk 65 and sector 73.

A drive dog 81 is securely clamped adjacent the end of cam shaft 26, and is connected to lug 68 of the disk 65 adjacent that end of cam shaft 26. This first disk 65 is thus driven by the cam shaft 26 as the shaft rotates. Although they are slidably mounted on shaft 26, the second and succeeding adjustable cams 24 are maintained in contact with one another and prevented from rotating under the influence of gravity by means of a spring 82 which is contained in hollow collar 83, secured to cam shaft 26 by means of set screw 84.

Stop cam 64 is essentially a collar, bored to fit over the end of cam shaft 26, having an elongated hub 87 extending toward the adjacent end of shaft 26. A thirty-two tooth, thirty-two pitch spur gear 88, having a hub 89, is pressed over hub 87, and the two pieces pinned to cam shaft 26. A single cleft 91 is milled into the rim of the collar to form stop cam 64.

A long flat spring 92 is fastened to framework 62 with its free end under light pressure against stop cam 64. A normally-open microswitch 93 is securely mounted on framework 62 under spring 92 and so adjusted that when spring 92 is riding on the raised periphery of stop cam 64 the microswitch circuit is closed, and when the end of spring 92 drops into cleft 91 in the stop cam 64 the microswitch circuit is opened.

An extension top plate 94 is attached to framework 62 or the inner wall of control box 14 to form a base for a standard "Skip Day Time Clock" 29, and a conventional fuse holder, and a single pole, single throw toggle switch (neither of these being shown). A synchronous motor 27 and a reduction gear 95, forming part of the gear train 28, are securely attached to framework 62. Reduction gear 95 may be of any standard design, with an output speed of one-third revolution per hour.

Motor pinion 96 will be varied depending on the requirements of the control mechanism. If a total watering cycle of four hours is required, the pinion 96 will have twenty-four teeth; and when they are all engaged, cams 24 will turn through an arc of seven and one-half degrees during each five minutes of operation of motor 27. If a six-hour cycle is required, pinion 96 will have sixteen teeth; and cam shaft 26 will turn each of the adjustable cams 24 through five degrees of arc in five minutes. Thus the size of pinion 96 governs the rotational speed of cams 24 and thus, as will be seen, the duration of operation of each of the hydraulic valves 12.

Returning now to FIGURE 4, each of the cam followers 25 is pivotally attached by means of pin 99 to a slide 101, which is free to reciprocate along its major axis in slide housing 102. Housing 102 in turn is securely attached to the top of the body of bleeder valve 23 by means of bolts 33 which pass through lugs 103, extending laterally from the sides of the housing 102.

An upwardly protruding arm 104 is formed on slide 101, and a pair of upwardly projecting supports 105 and 106 are formed on top of the two ends of slide housing 102. The upper end of cam follower 25, arm 104, and supports 105 and 106 are bored along a common line, lying parallel to the top of slide housing 102, and are adapted to receive loosely a rod 107. The opening in the upper end of follower 25 is elongated vertically to prevent rod 107 from interfering with its free pivotal movement.

Rod 107 is threaded at both of its ends, and is secured to arm 104 by means of lock nuts 108, which are threaded onto the rod on the front and rear sides of the transverse portion of arm 104.

An expansion spring 109, positioned on rod 104 between support 105 and rear lock nut 108, urges slide 101 outwardly of slide housing 102 when thumb nut 111 is tightened against the rear side of support 106. Two jam nuts 112 are threaded onto rod 107 on the forward side of support 106 to prevent excessive tightening of thumb nut 111. A second thumb nut 113 is threaded onto rod 107 between arm 104 and the rear side of the upper end of cam follower 25. A roller 114 is provided at the lower end of cam follower 25 to track smoothly, and to minimize the wear on the profile of adjustable cam 24.

Considering now the electrical diagram of FIGURE 9, when plug 117 is inserted in an electrical outlet current, passing through fuse 118, energizes clock 29. Two parallel circuits connect motor 27 to plug 117. The first is through single pole single throw clock switch 121, which is operated by conventional "on" and "off" lugs 122 on timer 29. The second is through microswitch 93, operated by stop cam 64.

From the foregoing description of the construction of one preferred embodiment of the subject invention, the operation of the invention may now be easily followed. With the particular motor pinion gear 96 desired for the specific watering cycle in place, and the rate of revolution of adjustable cams 24 known, lock screws 78 are utilized to adjust the clefts 79 of each of the cams 24 for the watering period required at each of the sprinkler arrays 13. This task may be facilitated by providing the inner faces of disks 65 with indicators 123 previously calibrated in terms of the rate of rotation for one or more pinion gears 96. Adjustable sector 73 may be constructed so that its edge 124 serves as an indicator marker.

With the profiles of adjustable cams 24 set and lock screws 78 tightened, jam nuts 112 and thumb nuts 111 are adjusted so that rollers 114 rest lightly against the profiles of their respective cams 24. While each roller 114 is in contact with the outer periphery of cam 24 extension 49 is in contact with the rear side of cam follower 25, and inlet valve 38 is in its open position, with relief valve 42 closed. Water pressure in control line 16 maintains the associated hydraulic valve 12 closed.

The "on" lug 122 of electrical timer 29 is set to initiate the watering cycle at a predetermined time, and when the timer 29 reaches that time clock switch 121 is closed, actuating motor 27.

The profile of stop cam 64 is designed to cause spring 92 to close microswitch 93 shortly after motor 27 begins turning cam shaft 26. "Off" lug 122 is preferably positioned closely adjacent the "on" lug, only sufficient spacing being provided to insure the actuation of microswitch 93 before the "off" lug reopens clock switch 121. By this means the electrical timer 29 is effectively re-set in anticipation of the next watering cycle, following the shut-down of the system by stop cam 64 upon completion of the present cycle.

Although normally one full revolution of cam shaft 26 will be required for each watering cycle, under some conditions more than one cycle may be achieved during a single revolution of shaft 26 by the selection of an appropriate stop cam 64, having two or more stop positions, and the provision of two or more sets of "on" and "off" lugs 122 on electric timer 29.

Thus, for example, if desired a control system embodying the subject invention may be programmed to water the lawn areas covered by, say, half of the sprinkler arrays 13 during the early morning hours, then to remain inactive until later on in the day, and thereafter to actuate the remaining sprinklers.

Continuing with the operation of the system, as motor 27 and gear train 28 rotate cam shaft 26 drive dog 81 causes the first of the cams 24 to rotate. When roller 114 reaches cleft 79 in the profile of that cam 24 follower 25 moves away from its associated valve 23, pivoting around pin 99 and allowing extension 49 and pusher pin 45 to be thrust forwardly by spring 41 until inlet valve 38 is seated and relief valve 42 is fully opened. In this configuration pressure is bled from control line 16 and hydraulic valve 12 associated with the first cam 24 opens, permitting water from the main 11 to flow to the first of sprinkler arrays 13. During the watering cycle for this sprinkler array 13 motor 27 continues to drive cam shaft 26 and the first of cams 24. When roller 114 reaches the end of cleft 79 and is thrust rearwardly by the external profile of the cam 24, follower 25 forces extension 49 and pusher pin 45 rearwardly into bleeder valve 23, closing the relief valve 42 and reopening inlet valve 38. Pressure is raised in control line 16, thereby closing the first of hydraulic valves 12 and shutting off the flow of water to its sprinkler array 13.

While the first of cams 24 was being rotated by the direct action of drive dog 81 the dog 76 on the adjustable sector 73 of the first cam was rotating with the cam. The design and location of the dogs 76 of each of the sectors 73 and the lugs 68 of the second and successive disk 65 is such that the roller 114 of each successive valve 23 reaches the cleft 79 of its associated cam 24 at substantially the same time as the roller 114 of the preceding valve 23 reaches the end of the cleft 79 of the cam 24 associated with it. This arrangement insures that only one of the hydraulic valves 12 will be open at any given time during the overall watering cycle and therefore, that there will be no excessive demand placed on the pressure in main 11.

Should it be wished to eliminate one of the sprinkler arrays 13 from the automatic watering cycle, or to operate one or more of the arrays 13 out of the normal sequence or without going through all of the automatic cycles, the subject invention can be used to accomplish any of these results.

By turning thumbnut 113 against the upper arm portion of cam follower 25 the roller 114 may be rotated around pin 99 and away from the periphery of cam 24. With the rear side of arm 25 thus forced against extension 49 inlet valve 38 is maintained open throughout the watering cycle. Releasing thumbnut 113 returns the cam follower 25 and bleeder valve 23 to the automatic cycle.

Similarly with roller 114 resting against the periphery of cam 24, by loosening thumbnut 111 and permitting spring 109 to extend slide 101 away from support 105 follower 25 may be rotated around pin 99 until the spring 41 and water pressure in header 34 are able to force inlet valve 38 closed and relief valve 42 open. In this configuration the associate hydraulic valve 12 may be actuated manually for as long a watering period as desired. At the conclusion of the manual watering operation jam nuts 112 serve as convenient stops, permitting thumbnut 111 to be tightened to its starting position and the valve 23 returned to the automatic mode.

Although the subject invention has been described with a certain degree of particularity, it is understood that the present disclosure has been made only by way of example, and not by way of limitation and that numerous changes in the details of construction and the combination and arrangement of parts may be resorted to without departing from the spirit and scope of the invention as hereinafter claimed.

What is claimed is:
1. An automatic control system comprising:
   a plurality of three-way valves having a pressure inlet, an outlet communicating with a remote pressure operated valve, and a relief, and valve means selectively movable between a first position wherein said outlet is connected with said inlet and a second position wherein said outlet is connected with said relief;
   a cam shaft;
   a first cam mounted on said cam shaft, secured thereto and driven thereby;
   a plurality of second cams mounted to rotate freely on said cam shaft adjacent said first cam;
   a dog and a lug formed on each of said second cams, each of said dogs being adapted to engage the lug on the next adjacent cam;
   a dog formed on said first cam adapted to engage the lug on the one of said second cams next adjacent it;
   a cleft in the profile of each of said cams;
   means for selectively varying the length of each of said clefts;
   a cam follower associated with each of said cams and controlling the movement of one of said valve means between said first position and said second position in accordance with the profile of said cam;
   means for rotating said cam shaft;
   first switch means activating said rotating means; and
   second switch means deactivating said rotating means after predetermined angular rotation of said cam shaft.

2. The automatic control system described in claim 1 in which:
spring means urge said cam followers against the profile of said cams.

3. The automatic control system described in claim 1 in which:
spring means urge said cam followers against the profiles of said cams; and
said valve means are connected to said cam followers.

4. The automatic control system described in claim 1 in which:
said three-way valves include a spring urging said valve means toward said second position;
said spring urges said cam followers against the profiles of said cams; and
said cam profiles are adapted to permit said valve means to move to said second position when said cam followers enter said clefts and to return said valve means to said first position when said cam followers leave said clefts.

5. The automatic control system described in claim 1 in which:
asid first switch means includes a timer for activating said rotating means at a predetermined time.

6. The automatic control system described in claim 1 in which:
said first switch means includes an electrical circuit containing a timer closing said circuit at a predetermined time; and
said second switch means includes a cam turning with said cam shaft and an electrical circuit containing a microswitch opened by said cam.

7. The automatic control system described in claim 1 in which: said first and second cams comprise:
a circular disk having a hub adapted to receive said cam shaft and having an arcuate lobe removed from a portion of its periphery;
a sector of a circular disk of the same diameter as said circular disk having a hub adapted to receive said cam shaft and having an arcuate cam lobe removed from a portion of its periphery; and
means for adjustably securing said sector to said disk with said cam lobes cooperating to form said cleft.

8. The automatic control system as described in claim 1 in which:
each of said cam followers comprises an elongated arm having a first end adapted to track said cam profile, said arm being pivotally supported at a point spaced from the opposite end thereof;
each of said three-way valves includes a spring urging said valve means toward said second position;
said valve means butts against said cam follower intermediate said pivotal support point and said first end thereof, thereby maintaining said follower in contact with the profile of said associated cam; and
said cam follower, valve means, and cam profile are adapted to allow said valve means to move from said first position to said second position when said cam follower beings tracking said cleft and to return said valve means to said first position when said follower leaves said cleft.

9. The automatic control system as described in claim 1 in which:
each of said cam followers comprises an elongated arm having a first end adapted to track said cam profile;
said arm is pivotally supported at a point spaced from the opposite end thereof by a supporting member;
each of said three-way valves includes a spring urging said valve means toward said second position;
said valve means butts against said cam followers intermediate said pivotal support point and said first end, thereby urging said first end of said follower against the profile of said cam;

said supporting member is selectively moveable toward said cam, thereby allowing said follower to rotate about said first end thereof until said valve means has moved from said first position to said second position; and
said supporting member is provided with adjustable means acting against the end of said follower opposite said first end to rotate said first end about said pivotal support point until said first end is no longer in contact with said cam profile, thereby effectively removing said three-way valve associated with said cam from operation with said automatic control system.

10. An automatic control system comprising
a plurality of three-way valves having a pressure inlet, an outlet communicating with a remote pressure operated valve, and a relief, and valve means selectively moveable between a first position wherein said outlet is connected with said inlet and a second position wherein said outlet is connected with said relief;
resilient means urging said valve means towards said second position;
a cam shaft;
a first cam mounted on said cam shaft, secured thereto and driven thereby, and a plurality of second cams mounted to rotate freely on said cam shaft adjacent said first cam, said first and second cams comprising
 a circular disk having a hub adapted to receive said cam shaft and having an arcuate lobe removed from a portion of its periphery,
 a sector of a circular disk of the same diameter as said circular disk having a hub adapted to receive said cam shaft and having an arcuate cam lobe removed from a portion of its periphery, and
 means for adjustably securing said sector to said disk with said cam lobes cooperating to form a cleft of selectively variable length in the profile of each of said cams;
a dog and a lug formed on each of said second cams, each of said dogs being adapted to engage the lug on the next adjacent cam;
a dog formed on said first cam adapted to engage the lug on the one of said second cams next adjacent it;
an elongated cam follower associated with each of said cams and a corresponding one of said three-way valves comprising an elongated arm having a first end adapted to track said cam profile, said arm being pivotally supported at a point spaced from the end thereof opposite said first end;
an extension on said three-way valve butting against its said associated cam follower intermediate said pivotal support and said first end thereof and urging said first end of said follower against the profile of said cam, said profile being adapted to permit said valve means to move to said second position when said cam followers enter said clefts and to return said valve means to said first position when said cam followers leave said clefts;
means for selectively moving the pivotal support for each of said cam followers toward its associated cam, thereby allowing said follower to rotate about said first end thereof until said valve means has moved from said first position to said second position;
selectively adjustable means acting against the end of each of said followers opposite said first end thereof to rotate said first end about said pivotal support until said first end is no longer in contact with said cam profile;
means for rotating said cam shaft;
first switch means activating said rotating means; and
second switch means deactivating said rotating means after predetermined angular rotation of said cam shaft.

References Cited

UNITED STATES PATENTS

| | | | |
|---|---|---|---|
| 2,821,434 | 1/1958 | Hunter | 239—66 X |
| 2,852,957 | 9/1958 | Breitenstein | 74—568 |
| 3,170,330 | 2/1965 | Reinecke | 74—568 X |
| 3,286,733 | 11/1966 | Hunter | 137—624.2 |
| 3,331,254 | 7/1967 | Stoll | 74—568 X |

ALAN COHAN, *Primary Examiner*.